United States Patent Office

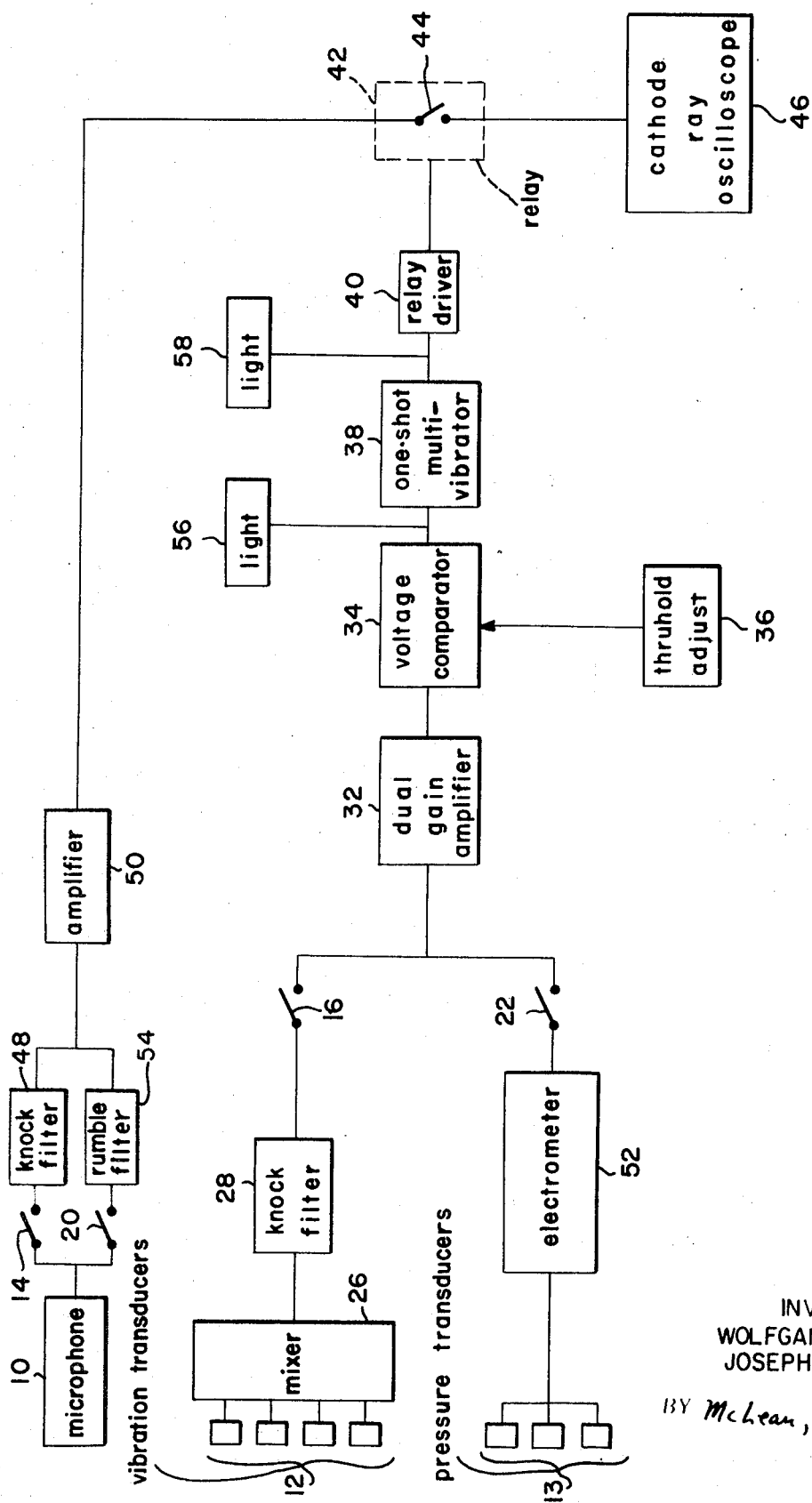

3,540,262
Patented Nov. 17, 1970

3,540,262
KNOCK AND RUMBLE DETECTOR FOR INTERNAL COMBUSTION ENGINES
Wolfgang J. Wostl, South Holland, and Joseph A. Heintz, Calumet City, Ill., assignors to Sinclair Research, Inc., New York, N.Y., a corporation of Delaware
Filed July 10, 1967, Ser. No. 652,070
Int. Cl. G01l 23/22
U.S. Cl. 73—35      5 Claims

ABSTRACT OF THE DISCLOSURE

A knock and rumble detector is disclosed whereby electric signals are generated external of an engine corresponding to a knock or rumble occurring within the engine. These signals are amplified and fed to a voltage comparator to which a threshold or reference voltage is also fed. The signal voltage and threshold voltage are compared, and when the signal voltage exceeds the threshold voltage, a pulse is emitted which ultimately activates a cathode ray oscilloscope. While the oscilloscope is activated, sounds originating from the knock or rumble detected are picked up by a microphone, filtered and fed to the oscilloscope so that a signal is displayed on the oscilloscope corresponding to the knock or rumble detected. In this manner, all knocks or rumbles above a given intensity are displayed on the oscilloscope. Knocks are detected using vibration transducers which are mounted at various points about the engine, and their outputs are mixed and filtered. Rumble is detected by pressure transducers mounted in each combustion chamber.

BACKGROUND OF THE INVENTION

Field of the invention

The invention relates to a knock and rumble detector for internal combustion engines and more particularly to apparatus which visually indicates the presence of knock or rumble above a fixed intensity within an internal combustion engine.

Description of the prior art

In the petroleum industry, automotive fuels for multi-cylinder engines are often evaluated for their antirumble and antiknock characteristics. These are normally determined by gradually increasing the severity of engine operating conditions for a given fuel until a trained operator audibly recognizes the presence of light knock or rumble. When knock or rumble is detected, the fuel is evaluated for its antirumble or antiknock characteristics from the engine-operating conditions at which the knock or rumble was first detected.

Similarly, in the rating of an automotive engine for its octane or LIB (leaded isooctane benzene) requirement, the engine is run under fixed operational conditions, and fuels having progressively lower octane ratings are introduced into the engine until a light rumble or knock is audibly detected by the operator.

Such detection methods involving an operator's judgment of the intensity of audible sounds inherently give poorly reproducible results even when a skilled operator is employed. The frequent need to compare results obtained by different operators makes close comparisons thoroughly unreliable.

It is, therefore, an object of this invention to provide an apparatus for detecting knock and rumble which will assure reproducibility of octane, antiknock and antirumble ratings and will enable results obtained with one fuel to be compared with that of another, even though the fuels may differ only slightly.

SUMMARY OF THE INVENTION

Fundamentally, this and other objects of this invention which will become apparent hereinafter, are obtained by providing a detection system employing detector transducers which are sensitive to the presence of nock and rumble and which generate electric signals responsive to the knock or rumble detected. The output signals of the detector transducers are fed to a comparator having a reference signal as a second input and which is operable to emit a pulse when the input from the detector transducers to the comparator exceeds the reference input, i.e., when knock or rumble above a predetermined intensity is detected by the transducers. An indicator device is connected to the output of the comparator and is actuated by the emitted pulses to provide visual indication of the detected knock or rumble.

The indicator device can be a lamp but preferably is a cathode ray display tube on which a signal corresponding to the sound of the knock or rumble detected is displayed for a limited interval each time a pulse is emitted from the comparator. The display on the cathode ray is responsive to the output of a sound pick-up transducer, such as a microphone, positioned adjacent the engine under observation and filtered to select the sound of the rumble or knock detected. Thus, when a knock or a rumble is detected above a preselected intensity, its sound is displayed on the cathode ray oscilloscope. It is desirable to limit the display to one knock or rumble sound for each cycle of the engine, therefore, the cathode ray tube display is under the control of a reset device which when actuated by the comparator upon the detection of a knock or rumble actuates the cathode ray tube for a time equal to one engine cycle.

BRIEF DESCRIPTION OF THE DRAWING

The sole figure is a schematic diagram of a knock and rumble analyzer according to the present invention.

DESCRIPTION OF THE PREFERRED EMBODIMENT

Referring to the sole figure, three types of sensing devices are used for the analysis conducted according to the present invention. A microphone 10, or sound transducer, is located close to the engine to sense the audible part of a knock or rumble; vibration transducers 12 are mounted at various locations on the engine block to sense abnormal vibration caused by knock; and pressure transducers 13 are incorporated into each combustion chamber to sense abnormal pressures that are associated with the presence of a rumble. A preferred type of pressure transducer, which is commercially available, utilizes a piezoelectric crystal incorporated into a modified spark plug and therefore requires no additional openings in the combustion chamber.

The system shown in the drawing can be used to analyze an engine or a fuel for either knock or rumble. When used for knock detection those switches designated in the drawing by numerals 14 and 16 are closed, and switches designated in the drawing by numerals 20 and 22 are open. In this position, since switch 22 is open, pressure transducers 13 are disconnected. The occurrence of a knock in the engine is sensed by vibration transducers 12. The output of these transducers is combined in a mixer 26, the output of which is fed into a filter 28 which eliminates all components of the signal other than those associated with engine knock. Filter 28 may be a single band pass filter or a combination of a low pass filter and a high pass filter set to pass signals in the frequency range 6,000 to 7,000 c.p.s.

From filter 28, the signals in the desired frequency range are passed to a dual gain amplifier 32 which is set at its relatively lower gain, typically 100. The output from amplifier 32 is fed into a voltage comparator 34 wherein the voltage of the signal is compared to a reference voltage fed to comparator 34 from a threshold adjust 36. Whenever the voltage of a signal from amplifier 32 exceeds the voltage from threshold adjust 36, a pulse is emitted from voltage comparator 34 and fed into a one-shot multivibrator 38. Each pulse from comparator 34 triggers multivibrator 38 which in turn emits a pulse of duration T which is preferably equal to the time of one complete engine cycle so that no more than one pulse per engine cycle can be emitted from multivibrator 38. This is necessary because comparator 34 can be triggered more than once in an engine cycle as the signals coming from amplifier 32 during the engine cycle contain several minima and maxima and, therefore, the threshold level can be exceeded more than once per cycle. The time T of the pulse emitted by multivibrator 38 can be changed by connecting additional capacitors into the multivibrator circuit; multivibrator 38 is thereby rendered applicable to different engine speeds. Each pulse emitted from multivibrator 38 triggers a relay driver 40 which in turn activates a relay 42 to close a switch 44 which activates a cathode ray oscilloscope 46 for time T.

When switch 44 is closed, a sound pattern coming from microphone 10 is displayed on the screen of oscilloscope 46 to indicate a presence of knock. The sound pattern coming from microphone 10, before it reaches oscilloscope 46, is passed through a knock filter 48 (switch 14 being closed) which is similar to filter 28 and, therefore, passes sounds in the frequency range 6,000 to 7,000 c.p.s. The filtered signal is then fed to an amplifier 50 having a suitable gain, typically 100, and then passed via switch 44 to oscilloscope 46. It will thus be seen that the presence of knock is indicated on oscilloscope 46 by a signal representing the actual sound of the knock being detected.

To sense rumble, switches 20 and 22 are closed and switches 14 and 16 are open. This eliminates vibration transducers 12, mixer 26 and knock filters 28 and 48 from the circuit. Dual gain amplifier 32 is switched to its relatively higher gain, typically 6,000. We have found that rumble is the result of excessively high combustion pressures and, therefore, the apparatus depicted in the drawing is designed to indicate the presence of rumble whenever the combustion pressure exceeds a preselected value. Pressure transducers 13 generate signals responsive to the pressure occurring within the cylinders of the engine. These signals are then passed to an electrometer 52 wherein the impedance of the pressure transducers 13 are matched with the impedance of amplifier 32.

After passing through electrometer 52, the signals are fed to amplifier 32 and from there pass to comparator 34. Comparator 34 now is triggered whenever a signal originating in transducers 13 and having passed through amplifier 32 exceeds the preset level of threshold adjust 36. Multivibrator 38, relay driver 40 and relay 42 operate in the same manner in conjunction with rumble signals (in the form of pulses emitter from comparator 34) as described above with reference to signals indicative of the presence of knock.

With switch 20 closed and switch 14 open, sounds originating from microphone 10 are passed through a rumble filter 54. Rumble filter 54 is either a band pass filter or a combination of a low pass filter and a high pass filter set to pass signals in the frequency range of 600 to 1,600 c.p.s., i.e., those engine sounds which are known to be associated with the occurrence of rumble. Signals passing through filter 54 are fed to amplifier 50, and during the interval when switch 44 is closed, these signals are passed to oscilloscope 46. The signal which appears visually on oscilloscope 46 is the sound originating with the rumble detected.

Lights 56 and 58 are provided to visually indicate signals emitted from comparator 34 and multivibrator 38 respectively. These lights flash whenever a pulse is emitted from the associated component and can be used in place of the oscilloscope to indicate the presence of rumble or knock.

We claim:

1. A device for detecting knock and rumble in an internal combustion engine which includes first generator means for selectively generating first electrical signals external of said engine corresponding in strength to either knocks or rumbles occurring within said engine; comparator means for comparing the signals generated with a reference signal and to emit a pulse when the strength of a generated signal exceeds the reference signal; second generator means for selectively generating second electrical signals external of said engine corresponding to the sound of the knocks or rumbles to which said first generator means is responsive; and a gate means for transmitting the signals from said second generating means to a visual indicating means for indicating said second electrical signals upon the emission of a pulse from said comparator.

2. A device according to claim 1 wherein said second generator means includes a microphone positioned near said engine to generate electrical signals corresponding to sounds coming from said engine, and filter means adapted to selectively pass only signals corresponding to either knock or rumble sounds and said visual indicating means is a cathode ray oscilloscope connected to the output of said filter means through said gate means.

3. The device according to claim 1 wherein the pulse emitted from said comparator means is fed to a one-shot multivibrator which is activated thereby to emit a timed pulse having a predetermined duration, said timed pulse being operative to activate said gate means for transmission of the signal from said second generating means to said visual indicating means.

4. The device according to claim 3 wherein the duration of said timed pulse is equal to the time required for said engine to complete one cycle of operation.

5. The device according to claim 1 wherein said first generator means includes vibration transducers, a signal mixer and a signal filter for signals corresponding to knocks and pressure transducers and an electrometer for signals corresponding to rumbles.

References Cited

UNITED STATES PATENTS

| | | | |
|---|---|---|---|
| 2,192,863 | 3/1940 | Hetzel et al. | 73—35 |
| 2,340,714 | 2/1944 | Traver et al. | 73—35 |
| 2,518,427 | 8/1950 | Lindberg et al. | 73—35 |
| 2,619,605 | 11/1952 | Lancor | 73—35 |
| 2,731,520 | 1/1956 | Richardson | 73—35 |
| 2,867,766 | 1/1959 | Broder et al. | 73—35 |
| 3,126,733 | 3/1964 | Heigl et al. | 73—35 |
| 3,393,557 | 7/1968 | Brown et al. | 73—35 |

OTHER REFERENCES

Felt et al.: "Rumble—A Deposit Effect at High Compression Ratios," presented at SAE meeting, 1958, 10 pages.

JAMES J. GILL, Primary Examiner

HERBERT GOLDSTEIN, Assistant Examiner